United States Patent [19]
Takahashi et al.

[11] Patent Number: 6,006,144
[45] Date of Patent: *Dec. 21, 1999

[54] DRIVING FORCE CONTROL APPARATUS FOR MOVING VEHICLE BY DESIRED DISTANCE

[75] Inventors: Hiroshi Takahashi, Tokyo; Katsunori Oshiage, Yokohama, both of Japan

[73] Assignee: Nissan Motor Co., Ltd., Yokohama, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/691,302

[22] Filed: Aug. 2, 1996

[30] Foreign Application Priority Data

Aug. 4, 1995 [JP] Japan ................... 7-219640

[51] Int. Cl.$^6$ ........................ G06F 7/70
[52] U.S. Cl. .............. 701/1; 701/70; 701/200; 701/302; 180/168; 180/170; 180/179; 180/167; 340/435; 340/436; 367/99
[58] Field of Search .............. 701/70, 80, 84, 701/85, 90, 96, 91, 301, 302, 1, 200; 180/167, 171, 179, 168, 170; 367/99

[56] References Cited

U.S. PATENT DOCUMENTS

| | | | |
|---|---|---|---|
| 4,962,453 | 10/1990 | Pong et al. .................... | 180/167 |
| 5,081,585 | 1/1992 | Kurami et al. ................. | 180/168 |
| 5,215,159 | 6/1993 | Nishida ........................ | 180/171 |
| 5,229,941 | 7/1993 | Hattori ........................ | 180/167 |
| 5,234,071 | 8/1993 | Kajiwara ...................... | 180/170 |
| 5,315,295 | 5/1994 | Fujii .......................... | 180/167 |
| 5,332,056 | 7/1994 | Niibe et al. ................... | 180/169 |
| 5,572,484 | 11/1996 | Gaus et al. .................... | 367/99 |
| 5,587,908 | 12/1996 | Kajiwara ...................... | 180/169 |
| 5,587,938 | 12/1996 | Hoetzel ........................ | 701/1 |
| 5,631,639 | 5/1997 | Hibino et al. .................. | 180/169 |
| 5,670,953 | 9/1997 | Satoh et al. ................... | 180/170 |
| 5,731,977 | 3/1998 | Taniguchi ...................... | 701/96 |
| 5,754,099 | 5/1998 | Nishimura et al. ............... | 701/301 |
| 5,790,970 | 8/1998 | Brachert et al. ................ | 701/70 |

FOREIGN PATENT DOCUMENTS

6-002576 1/1994 Japan .

*Primary Examiner*—William A. Cuchlinski, Jr.
*Assistant Examiner*—Yonel Beaulieu
*Attorney, Agent, or Firm*—Foley & Lardner

[57] ABSTRACT

A driving force control apparatus for moving a vehicle by a desired distance includes an input section for input a desired move distance, a throttle controller section for setting a throttle actuator of the vehicle at an opening degree, an actual moved distance detecting section for detecting an actual moved distance of the vehicle, and a braking section for stopping the vehicle by braking when the vehicle moved the desired distance. Therefore, a slight movement of the vehicle is simplified and therefore the load to a vehicle driver is decreased.

16 Claims, 9 Drawing Sheets

DRIVING FORCE CONTROL APPARATUS FOR MOVING VEHICLE BY DESIRED DISTANCE

BACKGROUND OF THE INVENTION

The present invention relates to an apparatus for moving a vehicle by a desired distance by controlling a throttle actuator and a braking system of the vehicle.

A variety of methods for automatically driving an automotive vehicle have been developed and proposed in order to further improve a reliability of vehicles. Japanese Patent Provisional Publication No. 6-2576 discloses an electronic throttle control apparatus where a throttle actuator and an accelerator pedal are electrically connected for electronically changing the relationship between the opening degrees of the throttle and the accelerator pedal. That is, by changing the relationship between the opening degree of the throttle actuator and the depression degree of the accelerator pedal according to the driving condition of the vehicle so that a driver can easily drive the vehicle without noticing the change of the driving condition.

However, such a throttle control system is not useful in a case that the vehicle is moving in a multi-level parking building so as to get over a vehicle stopper while being precisely stopped at a predetermined position. That is, percise acceleration-work and timely braking are required by a driver during such a vehicle position adjusting operation.

SUMMARY OF THE INVENTION

It is an object of the present invention to provide an improved apparatus for automatically moving a vehicle by a desired distance by means of a throttle actuator control and a brake control, which apparatus largely decreases a driver's load during a slight vehicle-move operation.

According to an aspect of the present invention, there is provided a driving force apparatus for moving a vehicle by a desired distance. The vehicle is equipped with a throttle actuator. The driving force apparatus comprises an input section, a throttle control section, an actual moved distance detecting section, and a braking force generating section. A desired move distance is inputted through the input section. The throttle control section inputs a throttle opening degree to the throttle actuator. The actual moved distance detecting section detects an actual moved distance of the vehicle. The braking force generating section stops the vehicle when the actual moved distance becomes the desired move distance.

According to another aspect of the present invention, there is provided a driving force control apparatus for moving a vehicle by a desired distance. The driving force control apparatus comprises a command inputting section, a move distance changing section, a throttle control section, an actual moved distance detecting section, and a braking force generating section. A driver inputs a move command for moving the vehicle through the command inputting section. The move distance changing section sets a target move distance when the move command is inputted to the command inputting section. The throttle control section inputs a throttle opening degree value to a throttle actuator of the vehicle. The actual moved distance detecting section detects an actual moved distance of the vehicle. The braking force generating section stops the vehicle when the actual moved distance becomes the desired move distance.

According to a further aspect of the present invention, there is provided an apparatus for moving an automotive vehicle to a desired distance position. The apparatus is installed to the vehicle including an internal combustion engine and a braking system. The apparatus comprises a move distance command button, a vehicle condition detecting section, a vehicle condition detecting section, a throttle actuator, a brake actuator and a controller. An operator of the vehicle commands the execution of the vehicle moving operation through the move distance command button. The vehicle condition detecting section detects a vehicle condition and outputs a signal when the vehicle satisfies a predetermined condition. An output condition of the internal combustion engine is controlled through a throttle actuator of the vehicle. A braking for stopping the vehicle is executed through a brake actuator of the brake system. The controller starts to control the throttle actuator and the brake actuator while monitoring the actual moved distance from the wheel speed sensor when the controller receives the signal from the vehicle condition detecting section. The controller continues the control of the throttle actuator and the brake actuator until the vehicle moves a predetermined distance, and then stops the vehicle.

DETAILED DESCRIPTION OF THE INVENTION

Figure 1:
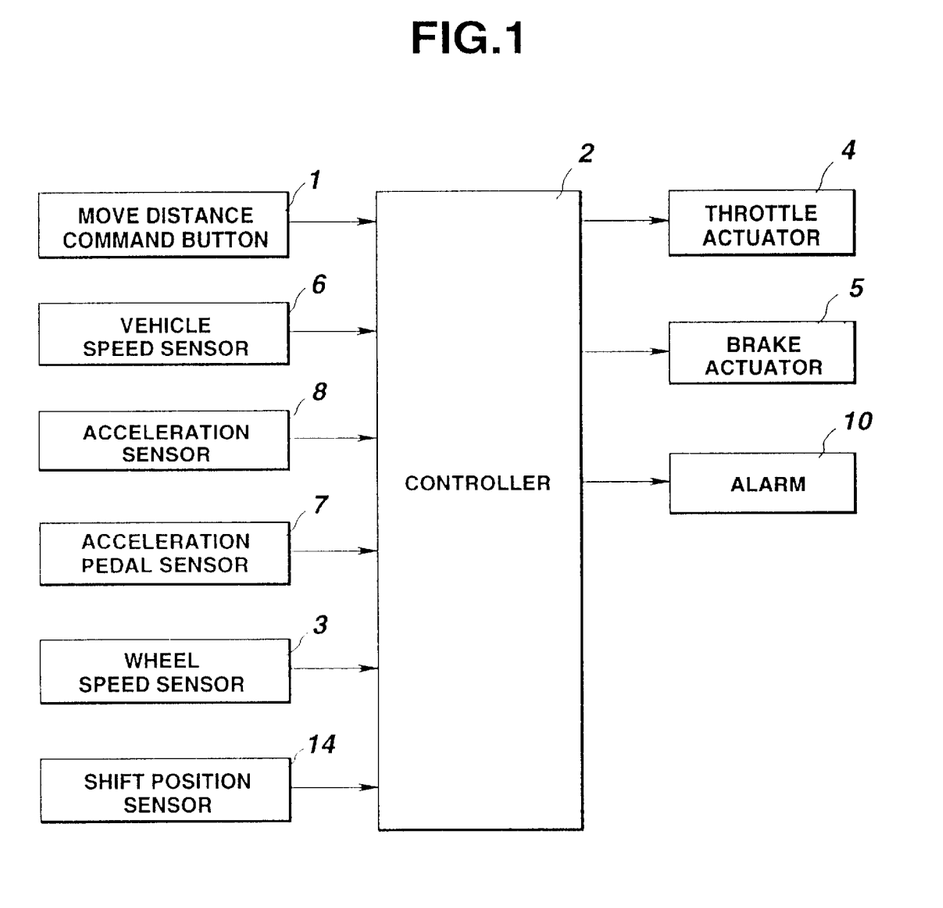
FIG. 1 is a block diagram which shows a first embodiment of a driving force control apparatus for moving a vehicle by a desired distance according to the present invention.
Figure 2:
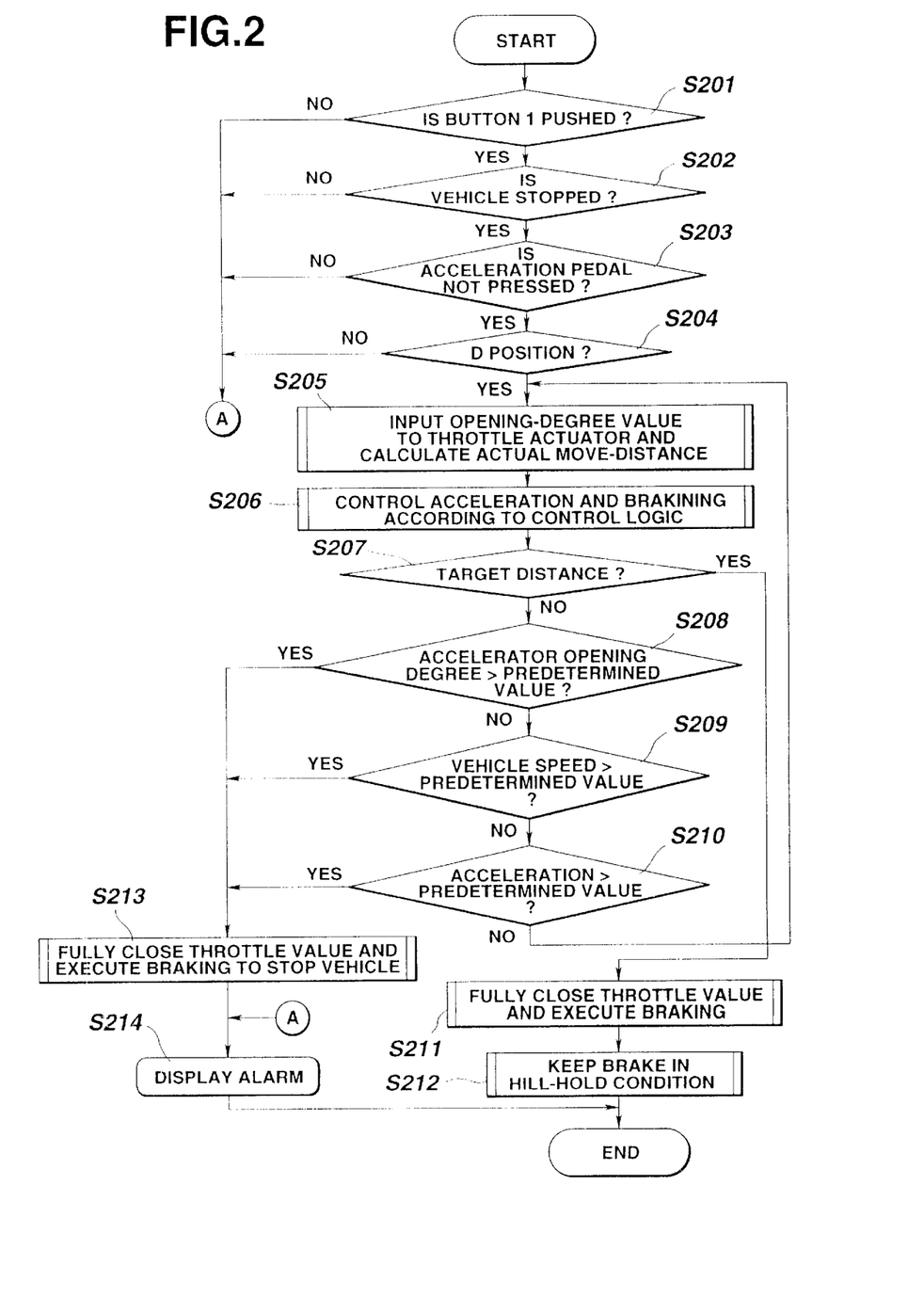
FIG. 2 is a flowchart of the driving force control apparatus of FIG. 1.

Referring to FIGS. 1 and 2, there is shown a first embodiment of a driving force control apparatus according to the present invention.

The driving force control apparatus is for moving an automotive vehicle, which is equipped with an internal combustion engine including a throttle system and a braking system, by a desired distance. The driving force control apparatus comprises a move distance command button 1, a vehicle speed sensor 6, an acceleration sensor 8, an acceleration pedal sensor pedal 7, a wheel speed sensor 3, a shift position sensor 14, a throttle actuator 4, a brake actuator 5, and an alarm 10, each of which is connected with a controller 2. The move distance command button 1 functioning as a move distance inputting means outputs a pulse signal to the controller 2 in reply to a pushing of the button 1 by a driver. The move distance command button 1 is not a retrigger type, and therefore repushing of the button 1 during the moving never increases the move distance if the move control has already started.

The vehicle speed sensor 6 corresponds to a vehicle speed detecting means and detects a vehicle speed. The acceleration sensor 8 is installed to a vehicle body of the vehicle and detects a fore-and-aft directional acceleration applied to the vehicle body. The accelerator pedal sensor 7 of a mechanical type is connected to an accelerator pedal of the vehicle and outputs a pulse signal from a normal open contact or a normal close contact. The wheel speed sensor 3 is installed in the vicinity of a wheel of the vehicle to detect a wheel rotation speed. The shift position sensor 14 is installed to an automatic transmission interconnected with the internal combustion engine of the vehicle, and detects a selected shift position of the automatic transmission.

The throttle actuator 4 is an electronic control type actuator which executes an opening and closing of a throttle valve by means of a driving force of an electric motor. The throttle actuator 4 may be an actuator which executes the opening and closing of the throttle valve upon receiving a command value from the controller 2 even if a driver does not push an acceleration pedal. More particularly, a commonly used throttle actuator, which is used in a traction controller, is applied to this throttle actuator 4. The brake actuator 5 is a pressure-type actuator which executes a braking even if a driver does not push the brake pedal. More particularly, a commonly used brake actuator, which is used in a traction controller, is applied to this brake actuator 5. The alarm 10 is a speaker for outputting alarm sound or alarm message and/or a CRT display for displaying an alarm message. This alarm 10 is disposed near a driver's seat in the vehicle so that the driver can easily recognize such information.

The controller 2 includes a CPU and a ROM, and they may be shared with those of an ECU (Engine Control Unit) installed in the vehicle or may be separate therefrom. This controller 2 activates a throttle control means, a braking force generating means and an actual travel distance detecting means by executing software stored in the ROM through the CPU. The controller 2 is arranged to execute a control for moving the vehicle by a predetermined distance, such as 10 cm, in reply to the input of a pulse signal from the move distance command button 1.

The manner of operation of the first embodiment of the driving force control apparatus according to the present invention will be discussed hereinafter with reference to a flowchart of FIG. 2.

At a step S201, the controller 2 decides as to whether the move distance command button 1 is pushed or not. When the answer of the step S201 is "YES", that is, when the driver pushes the move distance command button 1 so as to input the pulse signal from the move distance command button 1 to the controller 2, the routine proceeds to a step S202.

At the step S202, the controller 2 decides as to whether the vehicle is stopped or not by monitoring the signal from the vehicle speed sensor 6. When the answer of the step S202 is "YES", the routine proceeds to a step S203 wherein the controller 2 decides as to whether the accelerator pedal is not pressured by monitoring the detection signal of the accelerator pedal sensor 7. When the answer of the step S203 is "YES", the routine proceeds to a step S204 wherein the controller 2 decides according to a signal from the shift position sensor 14 as to whether the select lever of the automatic transmission is set at a drive range (D position) or not. When the answer of the step S204 is "YES", the routine proceeds to a step S205 wherein the throttle control means of the controller 2 inputs a signal indicative of a throttle opening-degree to the throttle actuator 4, and the actual moved distance detecting means of the controller 2 calculates a rotation angle of the wheel from the rotation pulse obtained by the wheel speed sensor 3, that is, the controller 2 calculates an actual moved distance. The throttle control means monitors the detection value of the actual moved distance detecting means and calculates a throttle opening degree value $\theta(t)$ according to the following equation (1).

$$\theta(t) = \alpha(y(t) - y^*) + \beta \Delta(y(t) - y^*) \tag{1}$$

wherein $\alpha$ and $\beta$ are constants, $y(t)$ is an actual move-distance after time t elapsed, $y^*$ is a target move distance, and $\Delta$ is a difference during time interval $\delta t$.

At a step S206, the braking force generating means of the controller 2 calculates a brake depression value $B(t)$ by using the following equation (2).

$$B(t) = \gamma(\exp(-1 \cdot (\epsilon \|y(t) - y^*\|)) + \zeta(\exp(-1 \cdot (\Delta \|y(t) - y^*\|)) \tag{2}$$

wherein $\gamma$, $\epsilon$ and $\zeta$ are constants, and $\Delta$ is a difference of time interval $\delta t$.

At a step S207, the controller 2 decides as to whether the actual moved distance is smaller than the target move distance or not by comparing the detection value of the actual moved distance detecting means with the target move distance. When the answer of the step S207 is "YES", the routine proceeds to a step S208 wherein the throttle control means of the controller 2 decides as to whether the throttle opening degree is greater than an upper limit opening-degree value (preset value). When the answer of the step S208 is "NO", the routine proceeds to a step S209 wherein the controller 2 decides as to whether the vehicle speed is greater than an upper limit vehicle speed or not. When the answer of the step S209 is "NO", the routine proceeds to a step S210 wherein the controller 2 decides as to whether the acceleration detected by the acceleration sensor 8 is greater than an upper limit acceleration value or not. When the answer of the step S210 is "NO", the routine returns to the step S205 for repeating the steps S205 to S210. If the detection value of the actual moved distance detecting means is zero at the step S205, the throttle control means increases the throttle opening degree value by $\delta$ at the step S206. Such a correction is repeated until the detection value of the actual moved distance detecting means takes a positive value. In this process, when the opening degree of the accelerator pedal reaches the upper limit opening-degree value, that is, when the answer at the step S208 becomes "YES", the routine jumps to a step S213 wherein the throttle control means outputs a command value for fully closing the acceleration throttle to the throttle actuator 4, and the braking force generating means promptly stops the vehicle by outputting the pressure command value to the brake actuator 5. Similarly, when the answer at any of the steps S209 and S210 becomes "YES", the routine jumps to the step S213.

At a step S214, the controller 2 outputs an alarm signal to the alarm 10 to output an alarm sound or an alarm message. This processing is effective in case that the running resistance to the vehicle is large, for example, in a up-slope or against a step for stopping the vehicle, this function prevents the vehicle from being radically accelerated after the up-slope or the step. In a case that the vehicle traversed the step before the throttle opening degree becomes the upper limit, the vehicle is radically accelerated after the step.

However, if in such a case the vehicle speed becomes greater than the upper limit value or the acceleration of the vehicle becomes greater than the upper limit value, the controller 2 executes the process at the step S213 to stop the vehicle. Further, the controller 2 executes the step S213 to stop the vehicle in order to prevent the vehicle from moving a distance greater than a predetermined distance in a case that the vehicle travels a down-slope or in a case that the vehicle speed becomes greater than a predetermined speed due to the delay of the braking control or lack of the braking force even if the throttle is not opened. Therefore, in a case that the acceleration becomes greater than a predetermined value, the controller 2 executes the process for stopping the vehicle.

On the other hand, as the step S207, when the detection value of the actual moved distance detecting means becomes the target move distance such as 10 cm, the brake force generating means outputs the pressure command value to the brake actuator 5. The pressure command value is gradually increased according to the equation (2). During this operation, both the brake and the accelerator may be operated.

More particularly, when the answer at the step S207 becomes "YES", that is, when the detection value of the actual moved distance detecting means becomes the target move distance, the routine proceeds to a step S211 wherein the throttle control means of the controller 2 fully closes the throttle by outputting the command for fully closing the throttle to the throttle actuator 4, and simultaneously, the braking force generating means stops the vehicle by outputting a sufficient pressure command value to the brake actuator 5. After the vehicle is stopped, the routine proceeds to a step S212 wherein the brake force generating means keeps the hill-hold condition of the brake by outputting the pressure command to the brake actuator 5.

On the other hand, when the answer of any of the steps S201 to S204 is "NO", the routine jumps to the step S214 wherein the controller 2 outputs an alarm signal to the alarm 10 to output alarm sound or an alarm message.

Although the first embodiment has been shown and described such that the move distance command button 1 functions as a move distance inputting means, it will be understood that a ten key keyboard may be used as a moved distance inputting means such that the driver can freely set the move distance. Further, the alarm 10 may be arranged to display the actual moved distance of the vehicle during the control in order to inform the movement of the vehicle -to the driver.

With the thus arranged driving force control apparatus, a driver can easily executes a delicate vehicle control for slightly moving the vehicle.

[Second Embodiment]

Figure 3:
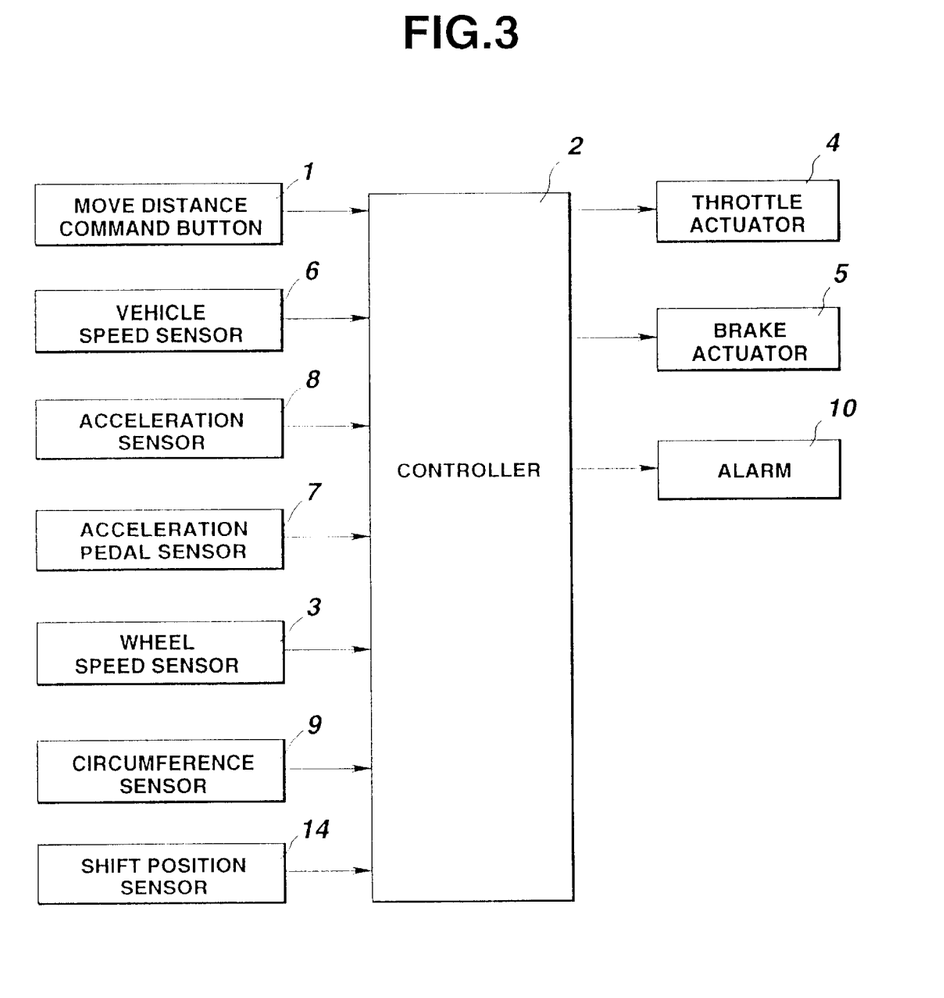
FIG. 3 is a block diagram which shows a second embodiment of the driving force control apparatus according to the present invention.
Figure 4:
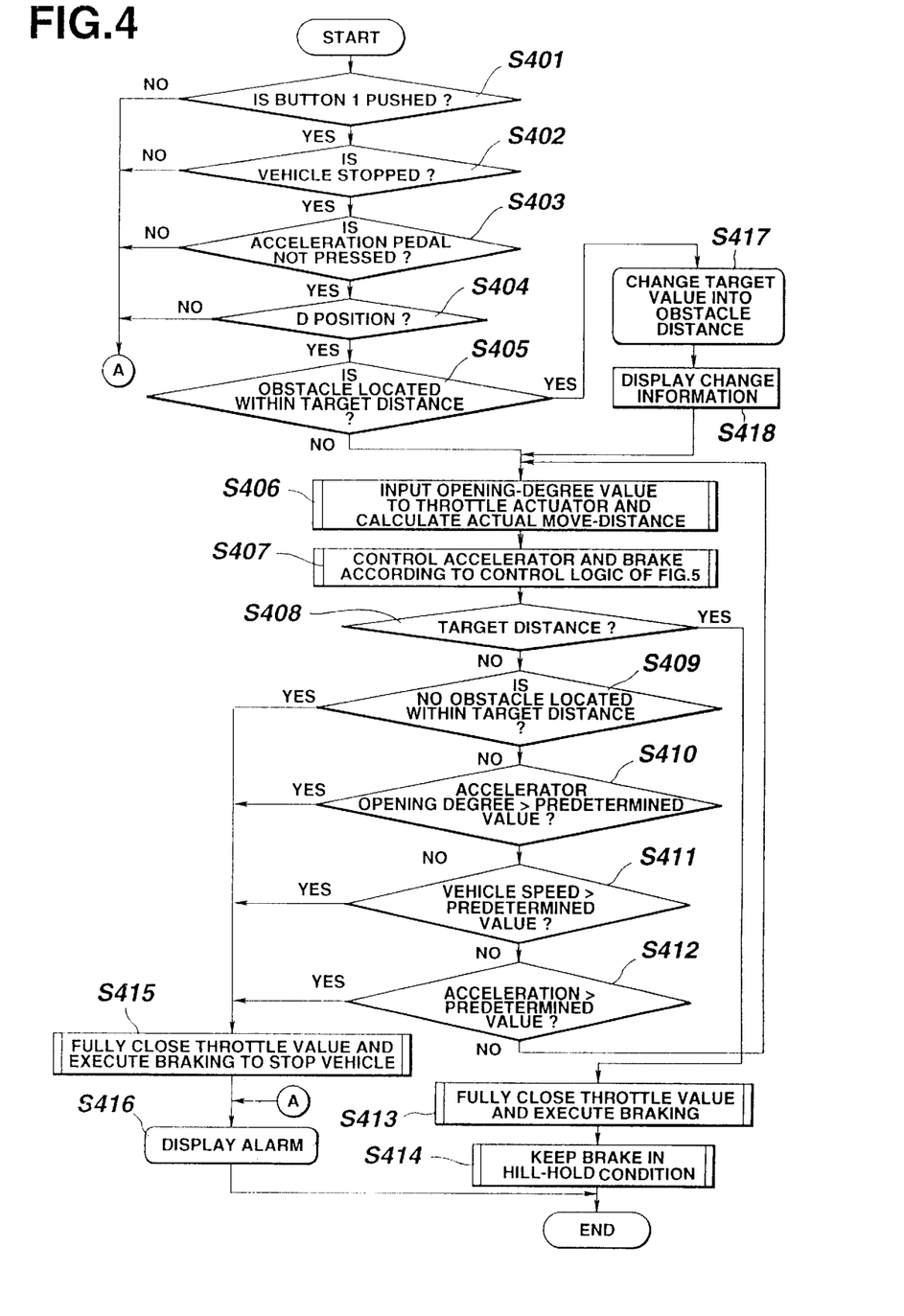
FIG. 4 is a flowchart of the driving force control apparatus of FIG. 3.

Referring to FIGS. 3 and 4, there is shown a second embodiment of the driving force control apparatus according to the present invention. The second embodiment is generally similar to the first embodiment except that a circumference sensor 9 and a corresponding program for utilizing this sensor 9 are installed in the apparatus of the second embodiment as shown in FIGS. 3 and 4.

The circumference sensor 9 is constituted by a laser radar or ultrasonic sensor and functions as an obstacle detecting means for measuring a distance between the vehicle and an obstacle located around the vehicle. The logic for realizing a comparing means and a move distance changing means is added into the controller 2 in the form of the program. The explanation of the same elements as those in the first embodiment is omitted herein.

The manner of operation of the second embodiment of the driving force controlling apparatus will be discussed hereinafter with reference to a flowchart of FIG. 4. The explanation of the same processing of this flowchart as the first embodiment are omitted herein.

The processing at steps S401 to S404 is the same as that at the steps S201 to S204 of FIG. 2. When the answer at the step S404 is "YES", the routine proceeds to a step S405.

At the step S405, the controller 2 decides as to whether an obstacle is located within a target distance or not (exists around the vehicle and more particularly in the proceeding direction of the vehicle or not) on the basis of the signal from the circumference sensor 9. When the answer of the step S405 is "YES", the routine proceeds to a step S417 wherein the target distance is changed into the distance to the obstacle.

Following this, the routing proceeds to a step S418 wherein the controller 2 informs that the target move distance was changed by means of the display or alarm. This process enables the vehicle to be stopped ahead of the detected obstacle with a predetermined distance. Then, the routine proceeds to a step S406. When the answer at the step S405 is "NO", the routine directly proceeds to the step S406.

The step S406 and steps S407 and S408 are the same as the steps S205 to S207 of FIG. 2. When the answer at the step S408 is "YES", the routine proceeds to the step S413. The step S413 and a step S414 are the same as the steps S211 and S212 of FIG. 2. When the answer at the step S408 is "NO, the routine proceeds to a step S409.

At the step S409, the controller 2 again decides as to whether the obstacle is located within the target distance or not. When the answer at the step S409 is "NO", the routine proceeds to the step S410. The step S410 and steps S411 and S412 are the same as the steps S208 to S210. When the answer at the step S409 is "YES", the routine proceeds to a step S415. The step S415 and a step 416 are the same as the steps S213 and S214 of FIG. 2.

It will be understood that the second embodiment of the driving force control apparatus according to the present invention may be arranged to inform the change of the target move distance through the alarm 10 in a case that the target move distance is changed.

With this arrangement, in a case that the vehicle is controlled in a narrow space such as a parking area, the moving control is executed while the detection of an obstacle is executed. This enables the vehicle to be securely moved without colliding with the obstacle.

[Third Embodiment]

Figure 5:
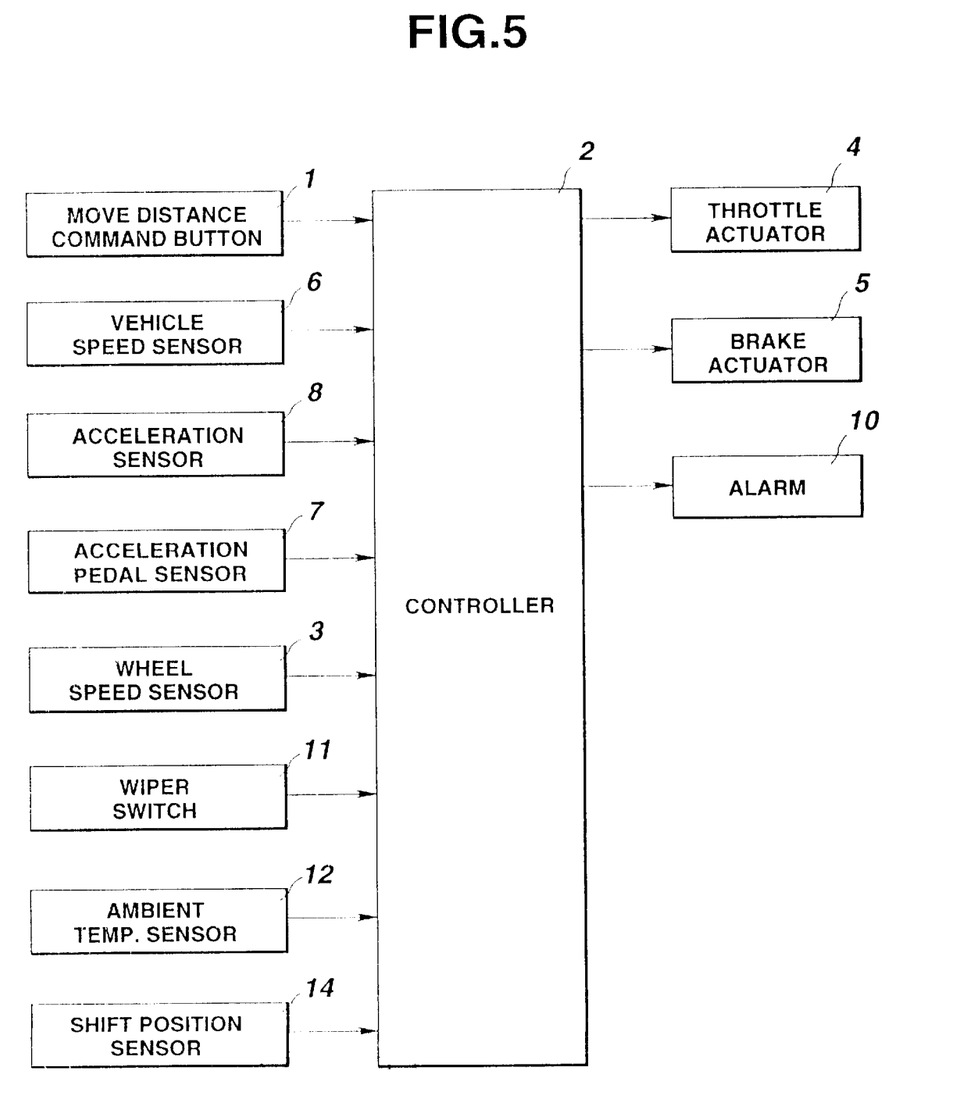
FIG. 5 is a block diagram which shows a third embodiment of the driving force control apparatus according to the present invention.
Figure 6:
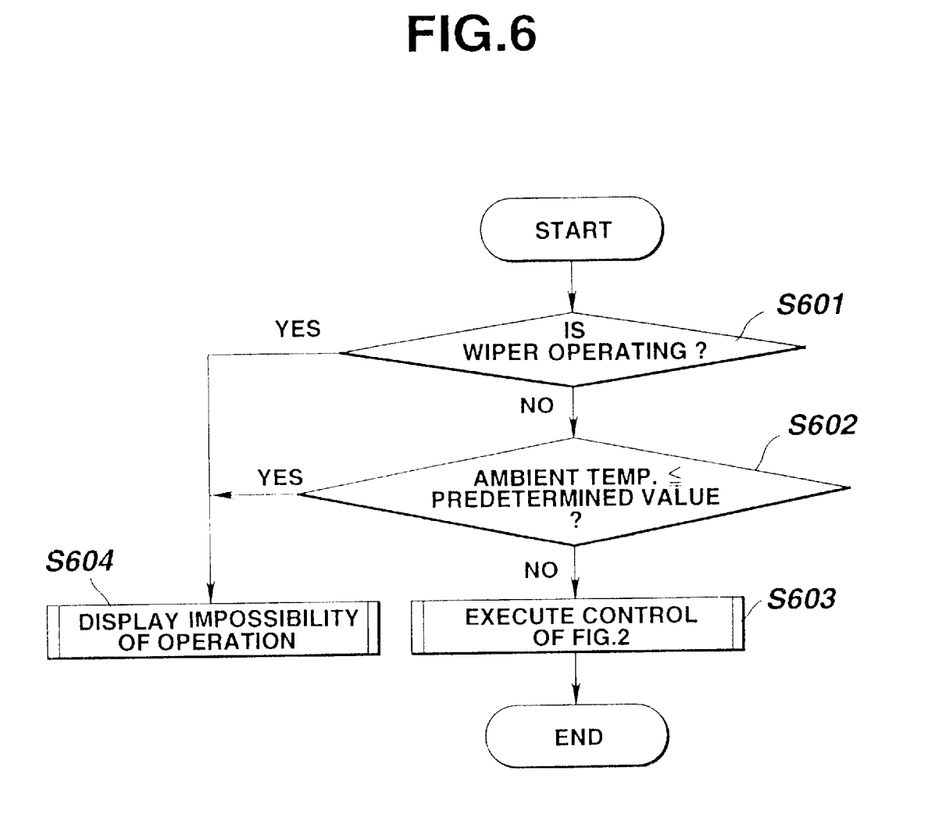
FIG. 6 is a flowchart of the driving force control apparatus of FIG. 5.

Referring to FIGS. 5 and 6, there is shown a third embodiment of the driving force control apparatus according to the present invention. The third embodiment is generally similar to the first embodiment except that a wiper switch 11, an ambient temperature sensor 12 and corresponding program for utilizing these elements 11 and 12 are installed in the apparatus of the third embodiment as shown in FIGS. 5 and 6. The explanation of the same elements as those in the first embodiment is omitted herein.

The wiper switch 11 for operating a wiper (not shown) of the vehicle is arranged to output a signal according the turning-on thereof. The ambient temperature sensor 12 for detecting the temperature outside of the vehicle is installed to the vehicle and outputs a signal indicative of the ambient temperature to the controller 2. The logic for realizing a friction coefficient detecting means is added into the controller 2 in the form of the program.

The manner of operation of the third embodiment of the driving force control apparatus will be discussed hereinafter with reference to a flowchart of FIG. 6. The explanation of the same processes as those of the first embodiment are omitted herein.

At a step S601, the controller 2 decides as to whether the wiper switch 11 is turned on or not after the move distance command button 1 is pushed. When the answer at the step S601 is "YES", the routine proceeds to a step S604 wherein the controller 2 outputs a massage indicative of the impossibility of the operation through the alarm 10. That is, if a road surface is wet due to rain which is detected by the signal from the wiper switch, the wheels of the vehicle may be excessively rotated. Therefore, since in such a condition it is difficult to precisely detect the moving-distance of the vehicle, the apparatus is arranged so as not to execute the present control. When the answer at the step S601 is "YES", the routine proceeds to a step S602 wherein the controller 2 decides as to whether the ambient temperature is smaller than or equal to a lower limit temperature or not by comparing the detection value of the ambient temperature sensor 12 with the lower limit value. That is, if a road surface is covered with snow or ice due to the cold weather condition, the wheels of the vehicle may be excessively rotated and the braking can not be effectively operated. Therefore, the apparatus is arranged so as not to execute the present control in such cold condition, such as when the ambient temperature is lower than −5° C. When the answer at the step S602 is "NO", that is, when the ambient temperature is higher than the lower limit temperature such as −5° C., the routine proceeds to a step S603 wherein the control of the flowchart of FIG. 2 is executed.

With the thus-arranged embodiment, the control for the preset distance movement is not executed in the condition that the precise movement cannot be executed due to the weather condition. Therefore, a reliability of this control is further improved.

[Fourth Embodiment]

Figure 7:
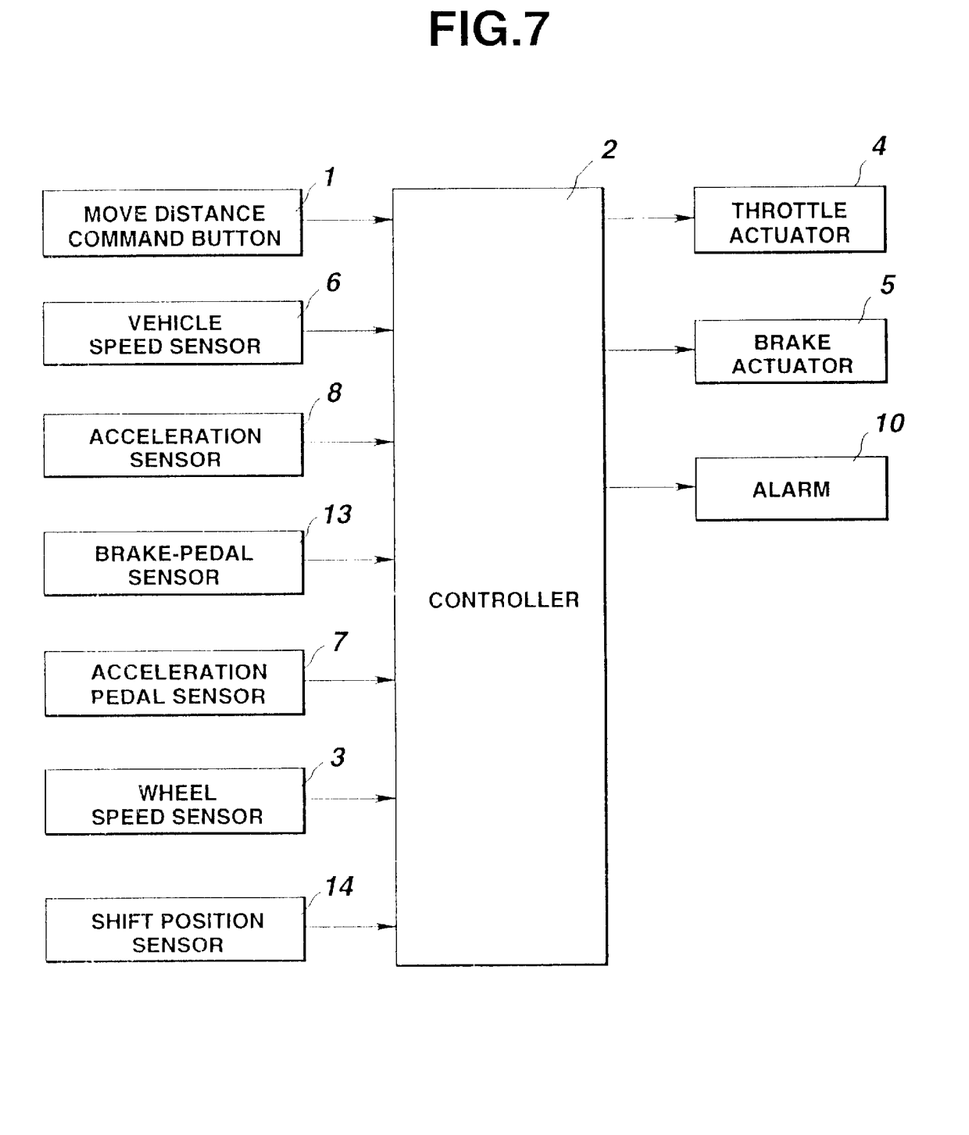
FIG. 7 is a block diagram which shows a fourth embodiment of the driving force control apparatus according to the present invention.
Figure 8:
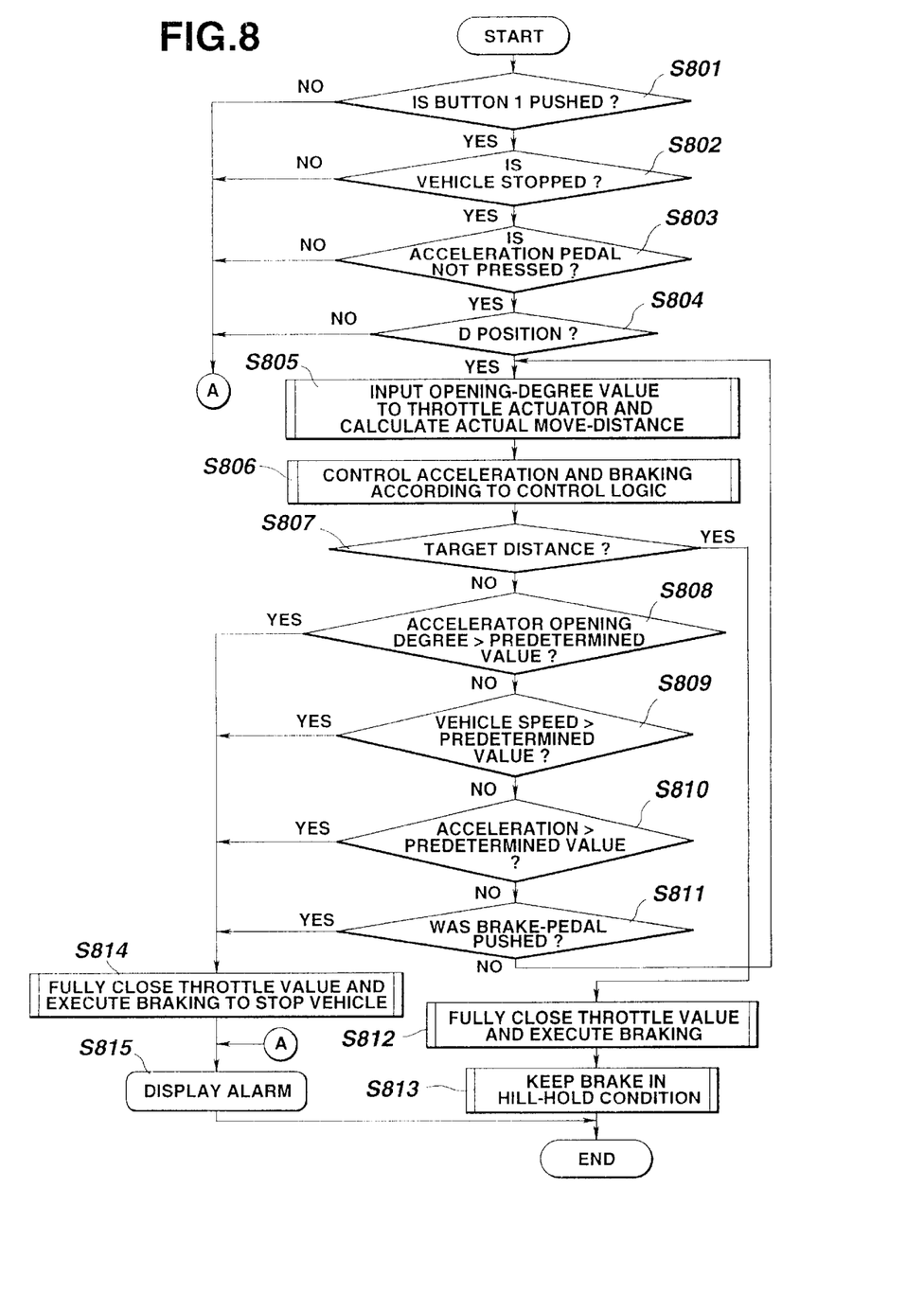
FIG. 8 is a flowchart of the driving force control apparatus of FIG. 7.

Referring to FIGS. 7 and 8, there is shown a fourth embodiment of the driving force control apparatus according to the present invention.

The fourth embodiment is generally similar to the first embodiment except that a brake pedal sensor 13 and its corresponding program for utilizing this element 13 are installed in the apparatus of the fourth embodiment as shown in FIGS. 7 and 8. The explanation of the same elements as those in the first embodiment is omitted herein.

The brake pedal sensor 13 is a sensor for detecting the depression degree of a brake pedal (not shown) and outputting a signal indicative of the depression degree to the controller 2, and its structure is basically similar to that of the accelerator. The program of the fourth embodiment includes a logic for stopping the control by stopping the vehicle when the depression of the brake pedal is detected during the preset-distance movement operation.

The manner of operation of the second embodiment of the drive-force controlling means will be discussed hereinafter with reference to a flowchart of FIG. 8. The explanation of the same processes as those of the first embodiment are omitted herein.

Steps S801 to S810 are the same as the steps S201 to S210 of FIG. 2.

Following to the "YES" answer of the step S810, at a step S811, the controller 2 decides as to whether the brake pedal is depressed by the driver or not. When the answer at the step S810 is "YES", the routine proceeds to the step S814 wherein the throttle control means outputs a command value for fully closing the acceleration throttle to the throttle actuator 4, and the braking force generating means promptly stops the vehicle by outputting the pressure command value to the brake actuator 5.

The step S814 and a step S815 corresponds to the steps S213 and S214 of FIG. 2. When the answer at the step S811 is "NO", the routine returns to the step S807 to repeat the steps S807 to S811. Steps S812 and S813 corresponds to the step S211 and S212 of FIG. 2.

With the fourth embodiment of the driving force control apparatus according to the present invention, even during this moving operation, the driver can freely and safely stop the vehicle.

Figure 9A:
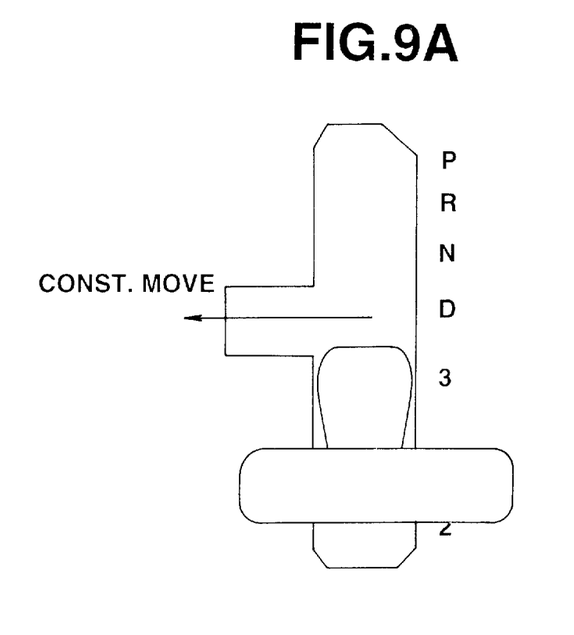
FIGS. 9A and 9B are top views each of which is a shift selector lever and a position indicator of other modification of the driving force control apparatus according to the present invention.
Figure 9B:
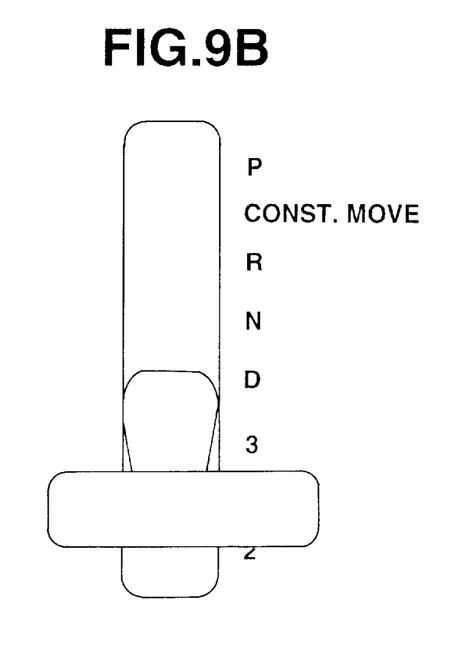

Although the preferred embodiments have been shown and described to start the driving force control for moving the vehicle by a desired distance by pushing the move distance command button 1, it will be understood that such a commanding means may be arranged to be installed in the select lever of the automatic transmission as shown in FIGS. 9A and 9B. That is, a special position such as a constant move position is provided in the select lever position, and when the select lever is set in the constant move position, the move distance command for starting the operation according to present invention is started by the depression of the accelerator pedal. Further, this type commanding means shown in FIGS. 9A and 9B may be arranged such that several times operations of this special shifting extends a predetermined move distance to the several times thereof.

Although the invention has been described in its preferred forms with a certain degree of particularity, it is understood that the present disclosures of the preferred forms may be changed in the details of construction and the combination and arrangement of parts may be resorted to without departing from the sprit and the scope of the invention as hereinafter claimed.

What is claimed is:

1. A driving force control apparatus for moving a vehicle by a small desired distance to park the vehicle, the vehicle being equipped with a throttle actuator, said driving force control apparatus comprising:

an input means for inputting a command to enter an automatic mode of the vehicle from a non-automatic driver-operated mode so as to move the small desired distance, wherein the move command provides for entering of the automatic mode when the move command is inputted after the vehicle has reached a fully stopped state in the non-automatic mode;

a throttle control means for inputting a throttle opening degree to the throttle actuator;

an actual moved distance detecting means for detecting an actual moved distance of the vehicle;

an obstacle detecting means for detecting a distance between the vehicle and an obstacle existing near the vehicle;

a comparing means for comparing the detection signal of said obstacle detecting means and the small desired distance;

a move distance changing means for lessening the small desired distance by a preset amount when said comparing means decides that the obstacle is within the small desired distance; and a braking force generating means for stopping the vehicle when the actual moved distance becomes equal to the small desired distance for a first case where no obstacle is determined to be within the small desired distance, and for stopping the vehicle when the actual moved distance becomes equal to the small desired distance lessened by the preset amount for a second case where an obstacle is determined to be within the small desired distance.

2. A driving force control apparatus as claimed in claim 1, further comprising a speed detecting means for detecting a vehicle running speed, said braking force generating means promptly stopping the vehicle when the detection value by said speed detecting means is greater than a predetermined value.

3. A driving force control apparatus as claimed in claim 1, further comprising a friction coefficient detecting means for detecting a friction coefficient between a road surface and a tire of the vehicle, said throttle control means forbidding to input the throttle opening degree to the throttle actuator when the friction coefficient value detected by said friction detecting means is smaller than a predetermined value.

4. A driving force control apparatus as claimed in claim 1, further comprising an acceleration detecting means for detecting an acceleration of the vehicle, said braking force generating means stopping the vehicle when the acceleration detected by said acceleration detecting means is greater than a preset value.

5. A driving force control apparatus as claimed in claim 1, further comprising a brake pedal sensor for detecting a depression degree of a brake pedal, said throttle control means outputting a command for fully closing the throttle actuator and stopping the vehicle by generating the braking force through said braking force generating means when said brake pedal sensor detects the depression of a brake pedal of the vehicle.

6. A driving force control apparatus as claimed in claim 1, further comprising means to cancel the automatic mode of the vehicle prior to the vehicle moving the desired move distance.

7. A driving force control apparatus as claimed in claim 6, wherein the means to cancel comprising a sensor for sensing an actuation of a braking pedal of the vehicle by the driver while the vehicle is in the automatic mode.

8. A driving force control apparatus for moving a vehicle by a small desired distance to park the vehicle, the vehicle being equipped with a throttle actuator, said driving force control apparatus comprising:
   a command inputting means through which a driver within the vehicle inputs a move command for moving the vehicle, the move command providing for the moving of the vehicle when the move command is inputted to enable an automatic mode after the vehicle has reached a fully stopped state during a non-automatic mode in which the driver is physically driving the vehicle;
   a move distance changing means for setting a target move distance equal to the small desired distance when the move command is inputted through said command inputting means;
   a throttle control means for inputting a throttle opening degree value to the throttle actuator;
   an actual moved distance detecting means for detecting an actual moved distance of the vehicle;
   an obstacle detecting means for detecting a distance between the vehicle and an obstacle existing near the vehicle;
   a comparing means for comparing the detection signal of said obstacle detecting means and the target move distance;
   a move distance changing means for lessening the target move distance by a preset amount when said comparing means decides that the obstacle is within the small desired distance; and
   a braking force generating means for stopping the vehicle when the actual moved distance becomes equal to the small desired distance for a first case where no obstacle is determined to be within the target move distance, and for stopping the vehicle when the actual moved distance becomes equal to the target move distance lessened by the preset amount for a second case where an obstacle is determined to be within the target move distance.

9. A driving force control apparatus as claimed in claim 8, wherein the move command causes the vehicle to enter an automatic mode in which the driver is not physically driving the vehicle, and
   wherein the apparatus further comprising means for cancel the automatic mode prior to the vehicle moving the desired move distance.

10. A driving force control apparatus as claimed in claim 9, wherein the means to cancel comprising a sensor for sensing of an actuation of a braking pedal of the vehicle while the vehicle is in the automatic mode prior to the vehicle moving the desired move distance.

11. An apparatus for moving an automotive vehicle to a small desired distance position to park the vehicle, said apparatus installed to the vehicle, with the vehicle including an internal combustion engine and a braking system, said apparatus comprising:
   a move distance command button by which a driver in the vehicle commands the execution of the vehicle moving operation, the move distance command button providing for execution of the vehicle moving operation when the move distance command button is operated during a non-automatic mode of the vehicle while the vehicle is in a fully stopped state, the move distance command causing the vehicle to enter an automatic mode of the vehicle for moving the vehicle by a target move distance;
   a vehicle condition detecting means for detecting a vehicle condition, said vehicle condition detecting means outputting a signal when the vehicle satisfies a predetermined condition;
   a throttle actuator for controlling the engine output of the vehicle;
   a braking actuator for stopping the vehicle;
   a controller configured to start control of said throttle actuator and said brake actuator while monitoring an actual moved distance of the vehicle when said controller receives the signal from said vehicle condition detecting means;
   a circumference sensor which measures an obstacle distance between the vehicle and an obstacle located near the vehicle. said controller changing the target move distance to the obstacle distance when the obstacle distance is smaller than the target move distance,
   said controller configured to continue the control of said throttle actuator and said brake actuator until the vehicle moves the target move distance, and then stopping the vehicle.

12. A driving force control apparatus as claimed in claim 11, wherein said vehicle condition detecting means includes a vehicle speed sensor which detects a running speed of the vehicle and outputs a speed signal, an acceleration sensor which detects an acceleration of the vehicle in a fore-and-aft direction and outputs an acceleration signal, an accelerator pedal sensor which detects a depression degree of an accelerator pedal of the vehicle and outputs an accelerator depressed signal, and a shift position sensor which detects a selected position of an automatic transmission connected to the engine and outputting a drive signal.

13. A driving force control apparatus as claimed in claim 11, further comprising an alarm for outputting information to a vehicle driver, said controller stopping the vehicle and outputting information indicative of the stopped condition when the opening degree of said accelerator pedal becomes greater than a first value, the vehicle speed becomes greater than a second value or the acceleration becomes greater than a third value.

14. A driving force control apparatus as claimed in claim 11, further comprising a wiper switch which operates a wiper of the vehicle and outputs a signal based on the turning-on thereof to said controller and an ambient temperature sensor which detects a temperature external to the vehicle and outputs a signal indicative of an ambient temperature to said controller, said controller stopping the execution of the move distance command when said controller determines that a road surface is wet according to the signal from the wiper switch or that the road surface is slippery due to ice or snow according to the signal from said ambient temperature sensor.

15. A driving force control apparatus as claimed in claim 11, wherein actuation of the move distance command button causes the vehicle to enter an automatic mode, and wherein the apparatus further comprising means for cancel the automatic mode prior to the vehicle moving the predetermined distance.

16. A driving force control apparatus as claimed in claim 15, wherein the means to cancel comprising a sensor for sensing n actuation of a braking pedal of the vehicle by the driver while the vehicle is in the automatic mode.

* * * * *